United States Patent [19]

Meininger

[11] Patent Number: 4,708,641
[45] Date of Patent: Nov. 24, 1987

[54] WASTE REMOVAL SYSTEM FOR PROBLEMATIC MATERIALS

[75] Inventor: Siegfried Meininger, Altenstadt, Fed. Rep. of Germany

[73] Assignee: Kraftwerk Union Aktiengesellschaft, Mulheim, Fed. Rep. of Germany

[21] Appl. No.: 17,467

[22] Filed: Feb. 20, 1987

[30] Foreign Application Priority Data

Feb. 21, 1986 [DE] Fed. Rep. of Germany ....... 3605693

[51] Int. Cl.$^4$ .......................... F23G 7/04; F23J 15/00
[52] U.S. Cl. .................................... 432/72; 110/246; 110/212; 110/215
[58] Field of Search .................. 432/72; 110/203, 210, 110/211–214, 215, 246

[56] References Cited

U.S. PATENT DOCUMENTS

| | | | |
|---|---|---|---|
| 3,771,471 | 11/1973 | Du Chambon | 110/246 |
| 3,841,239 | 10/1974 | Nakamura et al. | |
| 3,842,762 | 10/1974 | Sargent et al. | 110/215 |
| 3,848,548 | 11/1974 | Bolejack et al. | 110/346 |
| 3,906,874 | 9/1975 | Jaronko et al. | 110/215 |
| 3,938,450 | 2/1976 | Jaronko et al. | 110/246 |
| 4,241,672 | 12/1980 | Tuttle | 110/212 |
| 4,245,571 | 1/1981 | Przewalski | 110/212 |
| 4,395,958 | 8/1983 | Caffyn et al. | 110/246 |
| 4,473,013 | 9/1984 | John et al. | 110/213 |
| 4,575,336 | 3/1986 | Mudd et al. | 432/72 |

FOREIGN PATENT DOCUMENTS 2432504 2/1981 Fed. Rep. of Germany.
WO80/00230 10/1980 PCT Int'l Appl.

Primary Examiner—Henry C. Yuen
Attorney, Agent, or Firm—Herbert L. Lerner; Laurence A. Greenberg

[57] ABSTRACT

Waste conversion system with a low-temperature carbonizing chamber heated by flue gases and with a gas purification plant, in which, for removing problematic substances, the low-temperature carbonizing chamber is heated by flue gases of a high-temperature melting chamber which is supplied with, in particular, liquid wastes. The flue gases, after leaving the low-temperature carbonizing chamber, are conducted to the gas purification plant. The low-temperature carbonizing gases are conducted into the melting chamber.

10 Claims, 2 Drawing Figures

WASTE REMOVAL SYSTEM FOR PROBLEMATIC MATERIALS

BACKGROUND OF THE INVENTION

1. Field of the Invention

The invention relates to a waste removal system with a low-temperature carbonizing chamber heated by flue gas, and with a gas purification plant.

2. Description of the Prior Art

German Patent No. 24 32 504 relates to a device for the removal of domestic garbage from the aspect of recovering the valuable materials present in the domestic garbage.

The invention, on the other hand, is concerned with the removal of problematic materials. Among them are counted primarily the halogenated hydrocarbons which are used particularly in liquid form such as polychlorinated biphenyls (PCB), polychlorinated dibenzofuranes (PCDF), polychlorinated dibenzodioxines (PCDD) and further organic chlorine compounds. Such highly poisonous substances are decomposed at high temperatures, i.e., at least 1200° C., into harmless components. However, the cost of primary fuel heretofore required for this purpose is considerable.

SUMMARY OF THE INVENTION

It is therefore an object of the invention to provide a waste removal system in which problematic materials such as halogenated hydrocarbons are safely eliminated while using as little primary energy as possible and in addition, other problematic materials, especially oil-contaminated soil, can be treated in such a manner that they can be returned to natural recirculation.

With the foregoing and other objects in view, there is provided in accordance with the invention a waste conversion system, comprising a low-temperature carbonizing chamber wherein solid wastes containing organic substances are heated with the exclusion of air to temperatures in the range of 300° to 800° C. to effect decomposition and gasification of the organic substances, flue gas heating means around the low-temperature carbonizing chamber with a flue gas inlet in the heating means for the introduction of hot flue gas to heat the carbonizing chamber and a flue gas outlet in the heating means for the discharge of flue gas, waste charging means for feeding the solid wastes containing organic substances into the low-temperature carbonizing chamber, a residue outlet in the low-temperature carbonizing chamber for the discharge of ungasified wastes, a low-temperature carbonizing gas outlet in the low-temperature carbonizing chamber for the discharge of gaseous reaction products, a high-temperature melting chamber having an inlet for the introduction of liquid waste of high calorific value which is burned therein to aid in maintaining a temperature of at least 1200° C. in the melting chamber, a low-temperature carbonizing gas line connecting the low-temperature carbonizing gas outlet and the high-temperature melting chamber for the transfer of the gaseous reaction products from the carbonizing chamber to the melting chamber, a flue-gas outlet in the melting chamber for the discharge of hot gaseous combustion products designated hot flue gas, flue gas connecting means between the flue gas outlet in the melting chamber and the flue gas inlet in the heating means for the passage of hot flue gas, a flue gas purification unit for removal of deleterious substances from the flue gas, and flue gas discharge connecting means between the flue gas outlet in the heating means and the flue gas purification unit for transfer of the flue gas to the flue gas purification unit.

Other features which are considered as characteristic for the invention are set forth in the appended claims.

Although the invention is illustrated and described herein as embodied in waste removal system for problematic materials, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings in which.

DESCRIPTION OF THE PREFERRED EMBODIMENTS

Figure 1:
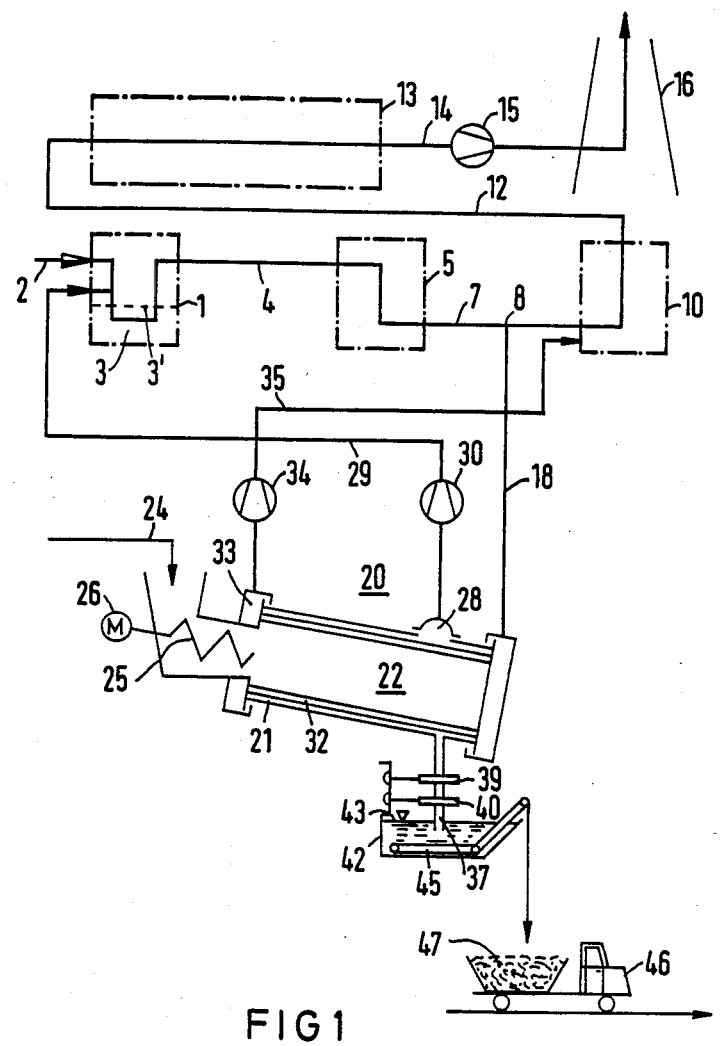
FIG. 1 diagrammatically illustrates the waste removal system in accordance with the invention and in particular the interlinking of the units making up the system.

A waste removal system with a low-temperature carbonizing chamber heated by exhaust gases, and with a gas purification plant. The low temperature carbonizing chamber for removing problematic substances is heated, by the flue gases of a high-temperature melting chamber which latter is charged with, in particular, liquid wastes. The flue gases after leaving the low-temperature carbonizing chamber, are conducted into the gas purification plant. The low-temperature carbonizing gases generated in the low-temperature carbonizing chamber are conducted into the melting chamber. For further saving of primary energy, the system may be equipped for generating energy with boilers such as a radiation boiler and a convection boiler, through which the flue gases flow before and/or after the low-temperature carbonizing chamber.

According to the invention, it is provided that, for removing problematic materials, the low-temperature carbonizing chamber is heated by flue gases of a high-temperature melting chamber which is charged with, in particular, liquid waste materials; that the flue gases, after leaving the low-temperature carbonizing chamber, are conducted into the gas purification plant; and that the low-temperature carbonization gases are conducted into the melting chamber.

In the system of the invention, poisonous wastes are therefore also burned at a high temperature. Here, however, waste substances, particularly in liquid form, for instance, as waste mineral oils, waste vegetable oils and fats, solvents, etc. are intentionally utilized as energy carriers, since their flue gases are used for heating the low-temperature carbonizing chamber, in which further wastes, namely, organically loaded solids such as oil-contaminated floors, oil-containing filter cakes, etc. are freed of the accompanying organic substances in a low-temperature carbonizing process by low-temperature carbonization with the exclusion of air. The temperatures in the range of 300° to 800° C. common for low-temperature carbonizing processes are obtained with the flue gases of the melting chamber.

It is further essential for the invention that the low-temperature carbonizing gases are conducted into the melting chamber. It is ensured thereby that the poisonous substances that might be contained in the low-temperature carbonizing gases of the kind mentioned above are made harmless. Thus is generated, without polluting the environment, a residue in the low temperature carbonizing chamber which can be stored, or used for instance, as backfill, without problem. In the device according to the invention, the dust taken along from the low-temperature carbonizing chamber is transferred into the slag of the melt. Flue gases produced from the low-temperature carbonizing gas, together with the flue gases from combustion of the liquid are conducted into the gas purification plant. Thereby, the release of poisonous substances into the environment is prevented. The invention operates practically without the addition of primary energy. Such an addition is practically necessary only for starting the plant.

The low-temperature carbonizing gas pipe leading from the low-temperature carbonizing chamber to the melting chamber, of the waste removal device according to the invention is advantageously heated in order to avoid condensation of poisonous substances which are to be decomposed further in the melting chamber. This may be accomplished for example by surrounding the gas pipe with a jacket in which is introduced a heating medium such as superheated steam, or by electrical heating means around the gas pipe.

The low-temperature carbonizing chamber is advantageously a carbonizing drum known per se. It is preferably equipped with a double-door lock for the dry discharge of the material subjected to low-temperature carbonization in the chamber. The outlet from the double-door lock leads to a humid-room atmosphere, particularly a water basin. The locks prevent the humid chamber from acting as a cooling trap, with harmful substance deposits coming about from the low-temperature carbonizing gas in the immersion water and wetted solid region.

A radiation boiler through which the flue gases flow for generating energy is advantageously arranged between the melting chamber and the low-temperature carbonizing chamber. The energy produced in the melting chamber which may not be required for heating the low-temperature carbonizing chamber, can be utilized with such a boiler. In addition, such boiler may be of advantage because the high-temperature of the flue gases can be lowered to a lower level suitable for heating the low-temperature carbonizing chamber.

A convection boiler through which the flue gases flow for generating energy can further be arranged between the low-temperature carbonizing drum and the gas purification plant. Thereby, a further gain of usable energy is attained.

A direct connection can be provided between the radiation boiler and the convection boiler. This makes it possible to vary and control the amount of flue gases fed to the low-temperature carbonizing chamber. Thereby, the flue gas feed can be adapted advantageously to the heat consumption of the low-temperature carbonizing chamber.

The connection would be controllable for this purpose by means, for example, of a valve interposed in the flue gas line leading toward the carbonizing chamber, or a valve in the direct connection, or both.

In a particularly advantageous embodiment of the invention, the radiation boiler and the convection boiler are structurally combined in a housing to which the flue-gas lines to and from the low-temperature carbonizing chamber and the flue gas line to the gas purification plant are connected. The melting chamber and a wet ash discharge common to both boiler parts can be connected to the housing. This arrangement is cost-effective and makes the operation of the new waste removal device particularly economical.

The waste removal device according to the invention is useful for decontaminating polluted soil, such as the bottoms of coking sites with excessive contents of tar oils. Heretofore, such solids have been taken to special garbage depositories which require a large amount of technical means and accordingly incur large costs.

Burning halogenated hydrocarbons in accordance with the invention has advantages over the known melting chamber resulting from the reduced use of primary energy which is decreased practically to zero, and from the treatment of all flue gases in the gas purification plant.

Figure 2:
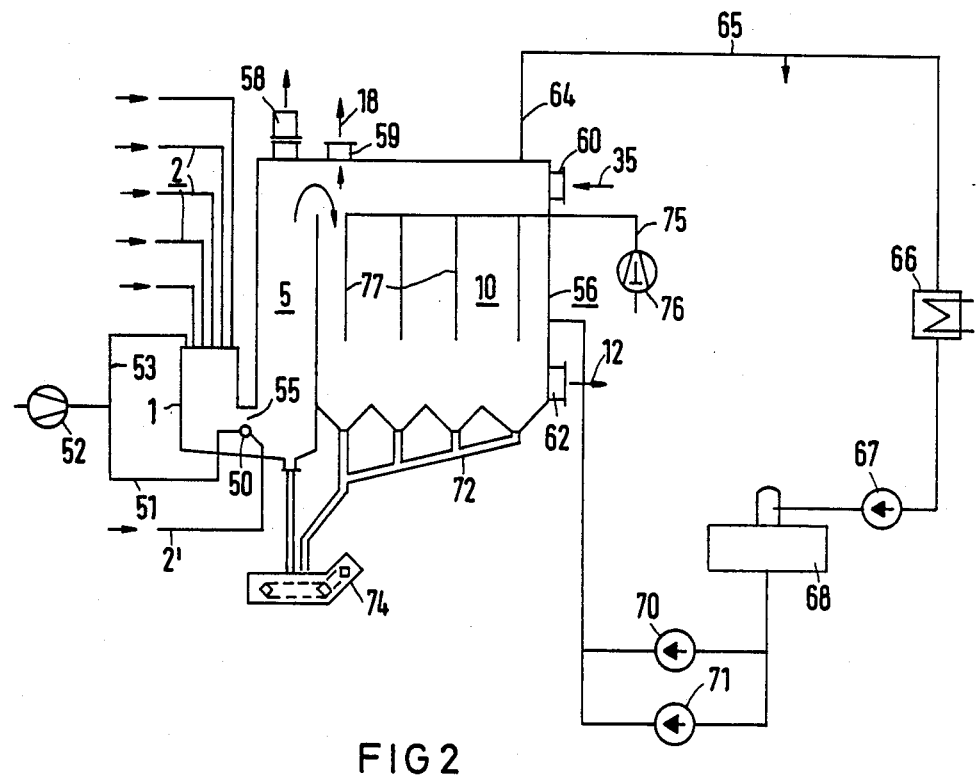
FIG. 2 shows schematically, the combination of the high-temperature melting chamber with a boiler system for generating energy by utilizing the flue gases of the melting chamber.

To explain the invention in greater detail, an embodiment example will be described, making reference to the drawings. FIG. 1 shows in a schematic presentation, the waste removal system as a whole, while FIG. 2 shows, likewise schematically, the combination of the high-temperature melting chamber with a boiler system for generating energy, utilizing the flue gases of the melting chamber.

In FIG. 1, a high temperature melting chamber 1 is indicated by its external outline shown by dash-dotted lines. The melting chamber operates at temperatures of at least 1200° C. The operating values of the temperature are customarily about 1400° C. For this purpose, the melting chamber 1 is charged via the waste line 2 with, in particular, liquid waste of high calorific value. The waste is, for instance waste oil or waste fat. It may further be solvents or plastic. However, the melting chamber can also be charged, at least additionally, with other waste material of high calorific value, for instance, with paper. The melt 3 in the melting chamber 1 comprises slag 3', indicated by a dotted line.

The melting chamber 1 is followed by a flue gas pipe 4 which leads to a radiation boiler 5. The radiation boiler operates as a steam generator where at temperatures in the range of about 1400° to about 1000° C. in the flue gas chamber, steam with temperatures of 270° C. at 27 bar can be generated. This steam could serve for driving a steam turbine which is not shown specifically.

The flue gases from the radiation boiler 5 are conducted through line 7 to a branch 8. From there, a part of the flue gases, for instance, 50% goes directly into a convection boiler 10. There, the flue gases at a temperature range of about 1000° C. to 350° C. are again utilized for generating steam. The steam temperature is, for example, 270° C.

A flue gas line 12 from the convection boiler 10 leads into a flue gas purifying plant 13. There, purification of the flue gases is performed in a known manner, particularly by scrubbing. The purified gases leaving the purifying unit 13 through line 14 are moved by a suction pump 15 toward a flue 16 from which the flue gases discharge into the atmosphere. To the extent that toxic liquids, for instance, acids are produced by scrubbing the flue gases with liquid in the purification, such liquid containing acids can be conducted to the melting chamber.

A further portion of the flue gas from the branch 8 with a temperature of 1000° C. or more is conducted via a line 18 toward a low-temperature carbonizing chamber 20, which is designed in the form of a, slightly tilted from the horizontal, low-temperature carbonizing drum 21, for the purpose of heating drum 21. A temperature of, for instance, 600° C. prevails in the interior 22 of the low-temperature carbonizing drum 21. At this temperature, the organic material in oil-contaminated soil, oil-containing filter substances or other problematic materials are carbonized, i.e. are subjected to decomposition with formation of light volatile constituents such as gases and vapors leaving residual solids. The feed material to carbonizing drum 21 are supplied by means of a charging device 24 and are moved into the interior 22 of the low-temperature carbonizing drum 21 via a worm 25 with an electric motor 26. The throughput of feed material is, for instance, 5 tons per hour with a running time of about 1 hour. The grain size of the feed material to be carbonized is, for instance, 20 mm.

The gas produced in the low-temperature carbonizing process is discharged by a blower 30 through an outlet 28 into a low-temperature carbonizing line 29 that can be heated. The blower transports the low-temperature carbonizing gas into the melting chamber 1. It is ensured thereby that at the high temperatures of more than 1200° C. all poisonous components of the gas, especially halogenated hydrocarbons are split into harmless components.

The flue gas of the line 18 flows through heating canals which are indicated by tubes 32 around the low-temperature carbonizing drum 21, in a direction counter to the transport direction. At the end of the drum 21 on the charging side, a connection 33 is provided, through which the "spent" flue gas is drawn off by a flue gas blower 34 and is transported via the flue gas line 35 into the convection boiler 10.

An outlet 37 for solids in the form of a double-door lock with the lock doors 39 and 40 is provided at the lower end of the low-temperature carbonizing drum 21. The outlet 37 leads into a water basin 42 and more specifically, below the water level 43. At the bottom of the water basin 42, a conveyor device 45, for instance, a running belt is provided. Thereby, the decontaminated residual matter 47 is removed for shipment which is indicated in the embodiment example by a truck 46. If contaminated soil is treated in the low-temperature carbonizing chamber 20, the decontaminated soil indicated 47 can be transported to a sanding site for back-filling.

It can be seen in FIG. 2 that the melting chamber 1 has five inlet pipes 2 for different waste materials which can be classified as to their consistence, their transport and burning properties and the calorific value. These lines 2 are for low-temperature carbonizing gas, for fuels from two supply tanks, for light oil and atomizer steam which lead into the top side of the melting chamber 1. Another line 2 furnishes light oil to a burner 50 for additional flames leads. A line 51 connected to a fresh-air blower 52 leads to the burner 50. The fresh air blower also supplies the melting chamber 1 directly with combustion air via line 53.

The high-temperature chamber 1 is connected with its flue gas outlet 55 directly to a housing 56, in which the radiation boiler 5 and the convection boiler 10 are combined as steam generators for generating power. An emergency chimney 58 which normally is shut off is supported on the top side of housing 56. Beside the emergency chimney there is an outlet 59, through which flue gas for heating the low-temperature carbonizing chamber 20 is drawn off; and the line with the arrow for conveying the flue gas corresponds to the line 18 in FIG. 1. As can be seen, the outlet 59 is located in the vicinity of the connection between the radiation boiler 5 and the convection boiler 10.

An inlet 60 is provided on the right-hand side of the housing 56. There, the flue gas coming from the low-temperature carbonizing drum 20 is fed back. The line 35 with the arrow therefor corresponds to the line 35 in FIG. 1. A further outlet 62 is provided for discharging the flue gases to the gas purification plant. Thus, the arrow at outlet 62 corresponds to the line 12 in FIG. 1.

The foregoing is a description corresponding, in substance, to German application No. P 36 05 693.6, dated Feb. 21, 1986, international priority of which is being claimed for the instant application and which is hereby made part of this application. Any material discrepancies between the foregoing specification and the specification of the aforementioned corresponding German application are to be resolved in favor of the latter.

There is claimed:

1. Waste conversion system, comprising a low-temperature carbonizing chamber wherein solid wastes containing organic substances are heated with the exclusion of air to temperatures in the range of 300° to 800° C. to effect decomposition and gasification of the organic substances, flue gas heating means around the low-temperature carbonizing chamber with a flue gas inlet in the heating means for the introduction of hot flue gas to heat the carbonizing chamber and a flue gas outlet in the heating means for the discharge of flue gas, waste charging means for feeding the solid wastes containing organic substances into the low-temperature carbonizing chamber, a residue outlet in the low-temperature carbonizing chamber for the discharge of ungasified wastes, a low-temperature carbonizing gas outlet in the low-temperature carbonizing chamber for the discharge of gaseous reaction products, a high-temperature melting chamber having an inlet for the introduction of liquid waste of high calorific value which is burned therein to aid in maintaining a temperature of at least 1200° C. in the melting chamber, a low-temperature carbonizing gas line connecting the low-temperature carbonizing gas outlet and the high-temperature melting chamber for the transfer of the gaseous reaction products from the carbonizing chamber to the melting chamber, a flue gas outlet in the melting chamber for the discharge of hot gaseous combustion products designated hot flue gas, flue gas connecting means between the flue gas outlet in the melting chamber and the flue gas inlet in the heating means for the passage of hot flue gas, a flue gas purification unit for removal of deleterious substances from the flue gas, and flue gas discharge connecting means between the flue gas outlet in the heating means and the flue gas purification unit for transfer of the flue gas to the flue gas purification unit.

2. Waste conversion system according to claim 1, wherein the low-temperature carbonizing gas line leading from the low-temperature carbonizing chamber to the melting chamber is provided with heating means to prevent condensation in the low temperature carbonizing line.

3. Waste conversion system according to claim 1, wherein the low temperature carbonizing chamber is an elongated hollow cylindrical drum tilted slightly from the horizontal to promote movement of the solid wastes therethrough, and wherein the drum is equipped with a double-door lock at the residue outlet for discharge of the residue into a container containing water.

4. Waste conversion system according to claim 1, including a radiation boiler interposed in the flue gas connecting means between the flue gas outlet in the melting chamber and the flue gas inlet in the heating means for generating power.

5. Waste conversion system according to claim 1 including a convection boiler interposed in the flue gas discharge connecting means between the flue gas outlet in the heating means and the flue gas purification unit for generating power.

6. Waste conversion system according to claim 5, including a direct connection of a line between the radiation boiler and the convection boiler for the passage of flue gas from the radiation boiler to the convection boiler.

7. Waste conversion system according to claim 6, wherein the radiation boiler and the convection boiler are structurally combined in one housing to which the flue gas lines to and from the heating means of the low-temperature carbonizing chamber and the flue gas line to the gas purification plant are connected.

8. Waste conversion system according to claim 7, wherein the melting chamber and wet ash discharge common to both the radiation boiler and the convection boiler are connected to the housing.

9. Waste conversion system according to claim 1, wherein the solid wastes containing organic substances fed to the low-temperature carbonizing chamber is polluted soil.

10. Waste conversion system according to claim 1, wherein the liquid waste of high calorific value burned in the high-temperature melting chamber is halogenated hydrocarbons.

* * * * *